United States Patent
Hu et al.

(10) Patent No.: US 11,798,155 B2
(45) Date of Patent: Oct. 24, 2023

(54) DEVICE FOR RECOGNIZING DEFECTS REMAINING IN FINISHED SURFACE OF PRODUCT IN IMAGES TAKEN UNDER MULTIPLE COLORS OF LIGHT

(71) Applicant: Fu Tai Hua Industry (Shenzhen) Co., Ltd., Shenzhen (CN)

(72) Inventors: Liu-Bin Hu, Shenzhen (CN); Wei Yang, Shenzhen (CN)

(73) Assignee: Fu Tai Hua Industry (Shenzhen) Co., Ltd., Shenzhen (CN)

( * ) Notice: Subject to any disclaimer, the term of this patent is extended or adjusted under 35 U.S.C. 154(b) by 43 days.

(21) Appl. No.: 17/551,535

(22) Filed: Dec. 15, 2021

(65) Prior Publication Data
US 2022/0375061 A1 Nov. 24, 2022

(30) Foreign Application Priority Data
May 19, 2021 (CN) .......................... 202121072502.7

(51) Int. Cl.
*G06T 7/00* (2017.01)
*G01N 21/88* (2006.01)
*H04N 23/56* (2023.01)

(52) U.S. Cl.
CPC ....... *G06T 7/0004* (2013.01); *G01N 21/8806* (2013.01); *G01N 21/8851* (2013.01); *H04N 23/56* (2023.01); *G01N 2021/8845* (2013.01); *G01N 2201/021* (2013.01); *G06T 2207/20081* (2013.01)

(58) Field of Classification Search
CPC ....... G01N 2021/8845; G01N 21/8806; G01N 21/8851; G01N 2201/021; G06T 2207/20081; G06T 7/0004; G06T 2207/30136; G06T 7/001; H04N 23/56
See application file for complete search history.

(56) References Cited

U.S. PATENT DOCUMENTS

2014/0187881 A1* 7/2014 Saito .................. A61B 5/14552
600/323

* cited by examiner

*Primary Examiner* — Tri T Ton
(74) *Attorney, Agent, or Firm* — ScienBiziP, P.C.

(57) ABSTRACT

A device to detect defects in a finished surface by analyzing images thereof taken under lighting of different colors includes a supporting mechanism, a transmitting mechanism, a detecting mechanism, and a processor. The transmitting mechanism carries and transmits the product. The detecting mechanism includes a detecting frame, and a light source assembly. The processor connects to a camera assembly, and preprocesses images obtained of the long side surfaces, of the width side surfaces, and of the chamfered side surfaces of the product to detect any defects of these surfaces of the product.

19 Claims, 12 Drawing Sheets

DEVICE FOR RECOGNIZING DEFECTS REMAINING IN FINISHED SURFACE OF PRODUCT IN IMAGES TAKEN UNDER MULTIPLE COLORS OF LIGHT

TECHNICAL FIELD

The present disclosure relates to manufacturing.

BACKGROUND

When aluminum alloy is used in electronic products, beneficial characteristics such as malleability, easy processing, light weight, and slow rate of corrosion can be expected. However, during processing, manufacturing, and transportation of products, defects such as scratches, edge collapses, depressions, knife marks, dirt, crush marks, bright spots, bright lines, imprints, pitting, acid drops, knife vibration patterns can be easily introduced.

When inspecting the product surface, visual inspections by human operators may be used to detect defects on the product surface and determine what types of defects. However, such a detection method has high labor cost and low efficiency.

Therefore, improvement is desired.

DETAILED DESCRIPTION

Figure 1:
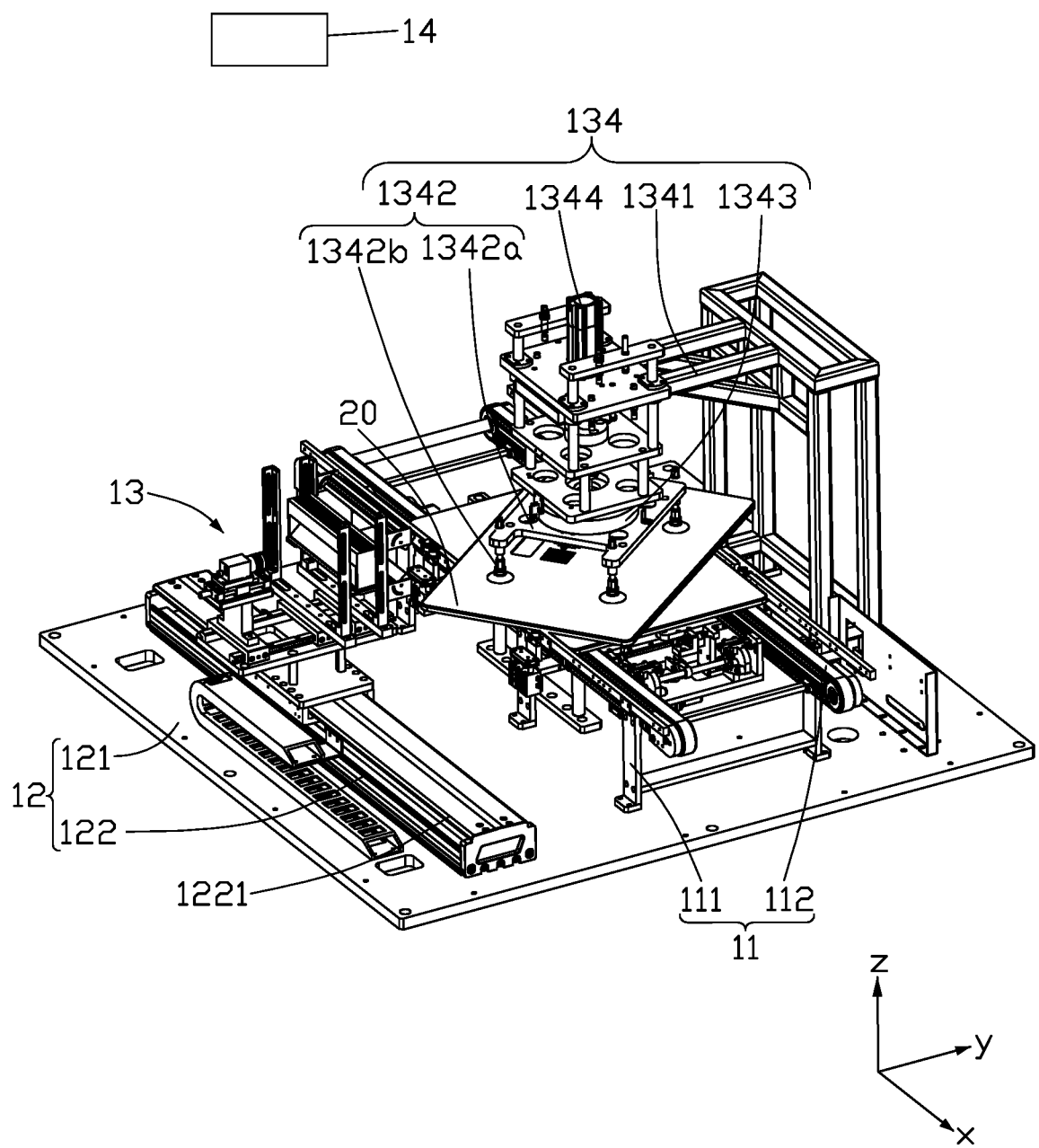
FIG. 1 is a schematic diagram of a detecting device according to an embodiment of the present disclosure.

The technical solutions in the embodiments of the present disclosure will be described in conjunction with the accompanying drawings in the embodiments of the present disclosure. Obviously, the described embodiments are part of the embodiments of the present disclosure, not all of them. Based on the embodiments of the present disclosure, all other embodiments obtained by those of ordinary skill in the art without creative work shall fall within the protection scope of the present disclosure.

In the description of the present disclosure, it should be understood that the azimuth or positional relationship indicated by the terms "center", "longitudinal", "transverse", "length", "width", "thickness", "upper", "lower", "front", "rear", "left", "right", "vertical", "horizontal", "top", "bottom", "inner", "outer", "clockwise" and "counterclockwise", is based on the azimuth or positional relationship shown in the attached drawings, which are only for the convenience of describing the present disclosure and simplifying the description, rather than indicating or implying that the device or element must have a specific orientation, or be constructed and operated in a specific orientation, so it cannot be understood as a limitation of the present disclosure.

The terms "first" and "second" are only used for descriptive purposes and cannot be understood as indicating or implying relative importance or implicitly indicating the number of indicated technical features. Thus, the features defining "first" and "second" may explicitly or implicitly include one or more of the features. In the description of the present disclosure, "multiple" means two or more, unless otherwise expressly and specifically defined.

In the description of the present disclosure, it should be noted that, unless otherwise clearly specified and limited, the terms "install", "connect" and "connection" should be understood in a broad sense, for example, it can be fixed connection, removable connection, or integrated connection. It can be mechanical connection, electrical connection, or duplex communication. It can be directly connected or indirectly connected through an intermediate medium. It can be a connection within two elements or the interconnection relationship between two elements.

In the present disclosure, unless otherwise expressly provided and limited, the first feature "above" or "below" of the second feature may include direct contact between the first and second features, or the first and second features may be not in direct contact, but through another feature between them. Moreover, if the first feature is "above", "above" and "above" of the second feature, this may include the first feature being directly above and obliquely above the second feature, or only indicating that the horizontal height of the first feature is higher than the second feature. If the first feature is "below", "below" and "below" of the second feature, this may include the first feature being directly above and obliquely above the second feature, or only indicating that the horizontal height of the first feature is less than that of the second feature.

The following disclosure provides many different embodiments or examples to implement different structures of the present application. In order to simplify the disclosure of the present application, the components and settings of specific examples are described below. These are merely examples and are not intended to limit the present application. In addition, the present application may repeat reference numbers and reference letters in different examples for the purpose of simplification and clarity, which itself does not indicate a relationship between the various embodiments and settings discussed.

FIG. 1 illustrates a detecting device 10 in accordance with an embodiment of the present disclosure.

The detecting device 10 is used to detect scratches, edge collapses, depressions, knife marks, dirt, crush marks, bright spots, bright lines, imprints, pitting, acid drops, knife vibration patterns, and other defects which are on a front 21 of a product 20. The product 20 has a square or rectangular structure. The product 20 can be an electronic device, such as mobile phone or tablet.

Figure 2:
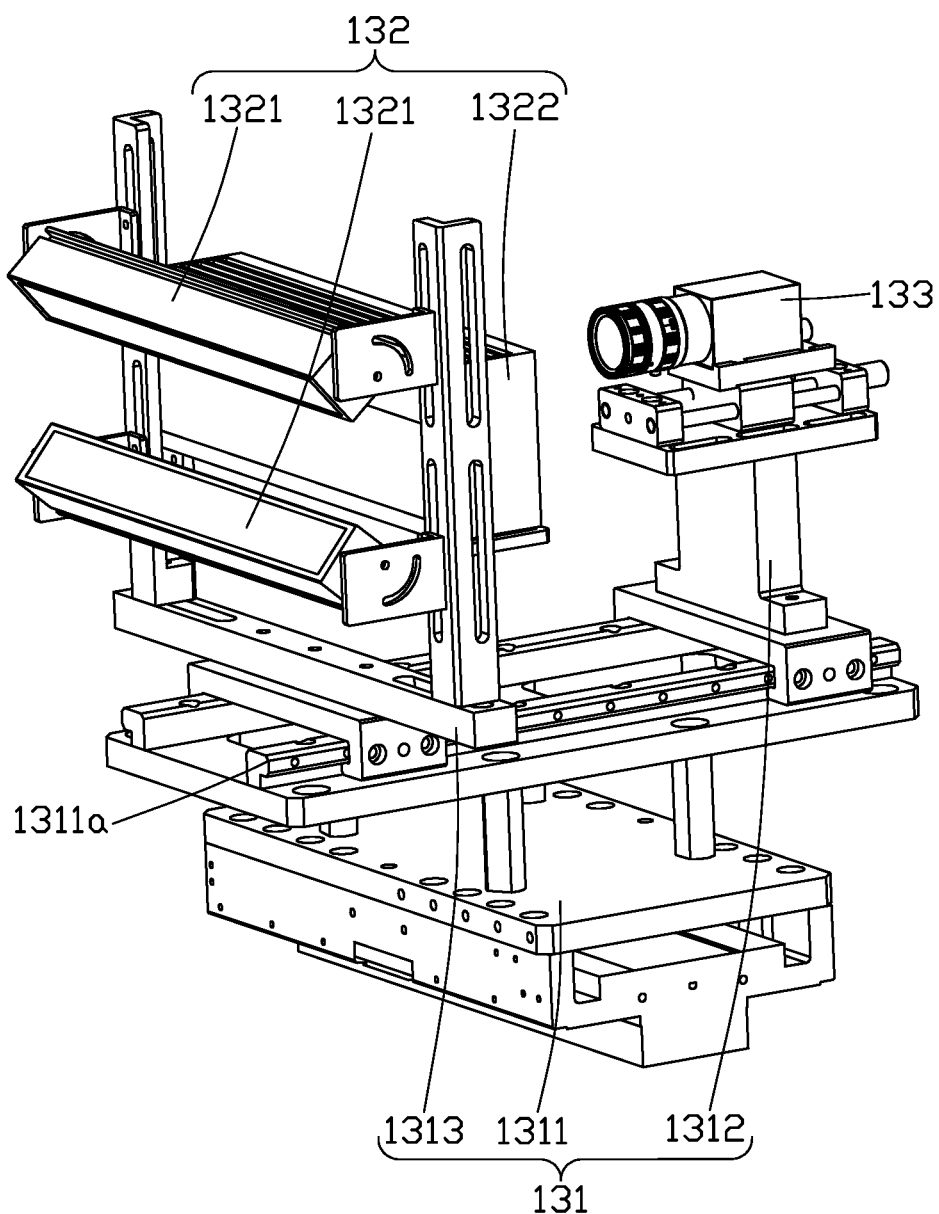
FIG. 2 is a schematic diagram of a detecting mechanism according to an embodiment of the present disclosure.

Referring to FIG. 2, the detecting device 10 includes a transmitting mechanism 11, a supporting mechanism 12, a detecting mechanism 13, and a processor 14. The transmitting mechanism 11 is used to carry and transmit the product 20 along a first direction. The transmitting mechanism 11 is arranged on the supporting mechanism 12. The detecting mechanism 13 includes a detecting frame 131, a light source assembly 132, a camera assembly 133, and a clamping assembly 134. The detecting frame 131 is arranged on the supporting mechanism 12 to move in the first direction, the optical axis of the camera assembly 133 is arranged in a second direction, the camera assembly 133 is slidably connected to the detecting frame 131 in the second direction, and the light source assembly 132 is connected to the detecting frame 131. The light source assembly 132 includes two red light strips 1321 and a blue light source 1322. The included angle between the light emitted by the two red light strips 1321 and the optical axis of the camera assembly 133 is an acute angle. Two red light strips 1321 are arranged along the first direction and spaced along a third direction. The third direction, the first direction and the second direction are perpendicular to each other, and the blue light source 1322 is arranged coaxially with the camera assembly 133. The clamping assembly 134 is arranged on the supporting mechanism 12 for clamping and rotating the product 20, so that the side surface of the product 20 is located between the two red light strips 1321. The camera assembly 133 is used to obtain an image of the side of the product 20 under the light of the light source assembly 132. The processor 14 is connected to the camera assembly 133, and the processor 14 is used to process the image of the product 20 to analyze the side surface of the product 20. The camera assembly 133 can be an array of cameras.

The detecting device 10 uses the camera assembly 133 to obtain the image of the side surface of the product 20 under the red light strip 1321 and the blue light source 1322. The detecting device 10 processes the obtained image through the processor 14. Therefore, the detecting device 10 cooperates with the camera assembly 133 to obtain image of the side surface of the product 20, and uses the processor 14 to automatically identify such defects as aforesaid, which improves the accuracy of analysis and saves labor cost.

The above processing of the image obtained by the processor 14 refers to comparing the obtained image with the standard image of a perfect product prestored in the processor 14, by using the discrimination model in the processor to determine such of the aforesaid defects as are revealed in the image. The formation process of the discrimination model is that the computer is trained to learn the scratch, edge collapses, depressions, knife marks, dirt, crush marks, bright spots, bright lines, imprints, pitting, acid droppings, knife vibration patterns, and other defects on the side surface of the product 20 (for example, features showing defects revealed in an image), establish a learning model for the learned content, and render the learned image information into a standard image library stored in the processor 14, and a discrimination model for determining positive defects of products, established according to the standard image database. The processor 14 may be a microcomputer.

In one embodiment, the supporting mechanism 12 includes a supporting platform 121 and a supporting frame 122. The transmitting mechanism 11 is arranged on the supporting platform 121, and the supporting frame 122 is arranged on the supporting platform 121. The supporting frame 122 is provided with a supporting rail 1221 arranged along the first direction, and the detecting frame 131 is slidably connected to the supporting rail 1221.

The supporting platform 121 can be connected to an external device to cooperate with the detecting device 10 to complete the operation.

In one embodiment, the transmitting mechanism 11 includes a transmitting bracket 111 and a transmitting belt 112. The transmitting bracket 111 is arranged on the supporting platform 121 adjacent to the supporting frame 122. The transmitting bracket 111 and the transmitting belt 112 can be extended on the supporting platform 121 according to actual need to adapt to the external device and cooperate with the detecting device 10 to complete the operation.

In one embodiment, the detecting frame 131 includes a first detecting rod 1311, a second detecting rod 1312, and a third detecting rod 1313. The first detecting rod 1311 is slidably connected to the supporting rail 1221, the first detecting rod 1311 is provided with a detecting rack 1311a arranged along the second direction, the second detecting rod 1312 is slidably connected to the detecting rack 1311a, and the camera assembly 133 is connected to the second detecting rod 1312, the third detecting rod 1313 is slidably connected to the detecting rack 1311a, and is located between the first detecting rod 1311 and the transmitting mechanism 11. The two red light strips 1321 and the blue light source 1322 are connected to the third detecting rod 1313. In the embodiment, one red light strip 1321, one blue light source 1322 and another red light strip 1321 are arranged in sequence along the second direction, the distance between each red light strip 1321 and the blue light source 1322 is the same, and the blue light source 1322 is located in between the two red light strips 1321.

The clamping assembly 134 includes a clamping frame 1341, a clamping member 1342, a first driving member 1343 and a second driving member 1344. The clamping frame 1341 is arranged on the supporting platform 121, the clamping member 1342 is used to clamp the product 20, and the first driving member 1343 is connected to the clamping member 1342 to drive the clamping member 1342 to clamp the product 20. The second driving member 1344 is arranged on the clamping frame 1341, and the second driving member 1344 is connected to the first driving member 1343 to drive the first driving member 1343 to rotate the product 20.

The clamping member 134 includes a clamping plate 1342a and a plurality of suction nozzles 1342b arranged on the clamping plate 1342a. The first driving member 1343 is connected to the clamping plate 1342a and a plurality of suction nozzles 1342b. The first driving member 1343 may be a suction-lift driver, which forms a vacuum adsorption assembly with the clamping plate 1342a and a plurality of suction nozzles 1342b for adsorbing the product 20 located on the transmitting belt 112. The second driving member 1344 may be a rotary driver, and the rotating end is connected to the first driving member 1343.

The first direction is the extension direction of the supporting rail 1221 that is the X axis in FIG. 1. The second direction is the extension direction of the detecting rack 1311a, that is the Y axis in FIG. 1. The third direction is vertical, that is the Z axis in FIG. 1. The first direction, the second direction, and the third direction are perpendicular to each other.

Figure 3:
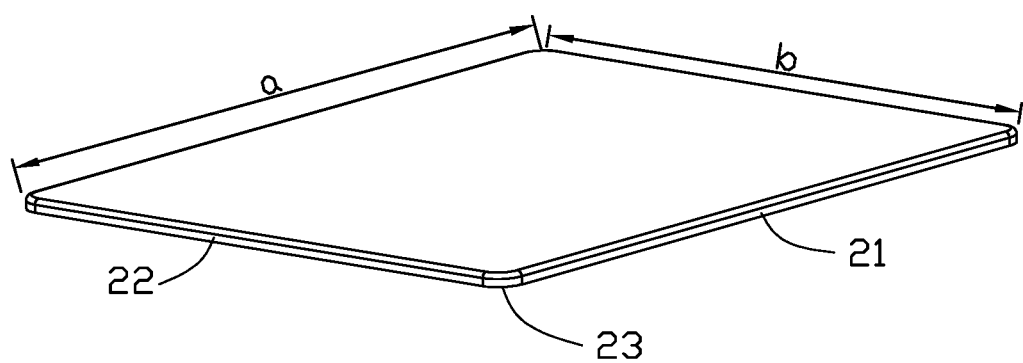
FIG. 3 is a schematic diagram of an examinable product according to an embodiment of the present disclosure.

Referring to FIG. 3, in the embodiment, the product 20 is a rectangular structure with chamfered edges, in which the surface formed by the length and height of the product 20 is determined as the long side surface 21, the surface formed by the width and height of the product is determined as the width side surface 22, and the surface which is chamfered is the chamfered side surface 23. The sides of the product 20 are thus composed of long side surfaces 21, the width side surfaces 22 and chamfered side surfaces 23.

Figure 4:
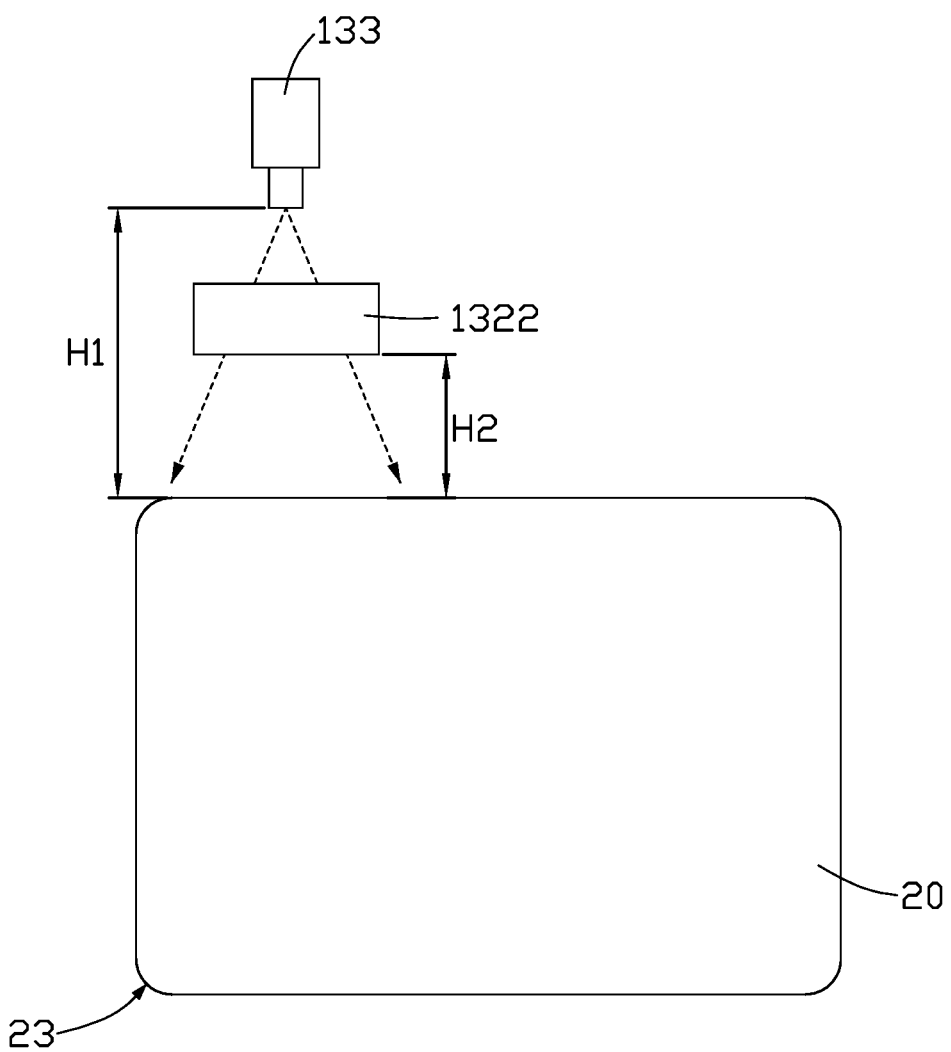
FIG. 4 is a schematic diagram of a blue light source, a camera assembly, and the long side surface of a product, in an embodiment of the present disclosure.

Referring to FIG. 4, in one embodiment, the detecting device 10 satisfies the relationship: H1=(0.2~0.8)*[(a+b)/2], H2=(0.1~0.5)*[(a+b)/2].

H1 is the distance from the camera assembly 133 to the long side surface 21, H2 is the distance from the blue light source 1322 to the long side surface 21, a is the length of the product 20, and b is the width of the product 20.

In the embodiment, the distance between the camera assembly 133, the blue light source 1322, and the long side surface 21 in the detecting mechanism 13 is configured to achieve a better image.

Figure 5:
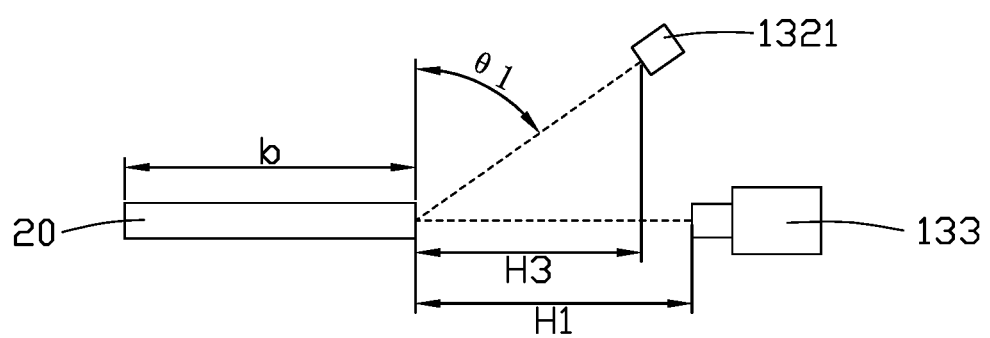
FIG. 5 is a schematic diagram of a red light strip, a camera assembly, and the long side surface of a product in a first state, in another embodiment of the present disclosure.
Figure 6:
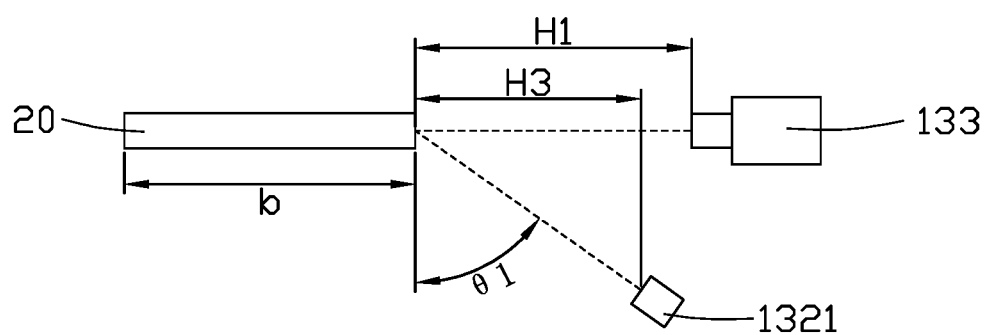
FIG. 6 is a schematic diagram of a red light strip, a camera assembly, and the long side surface of a product in a second state, in another embodiment of the present disclosure.

Referring to FIG. 5 and FIG. 6, in one embodiment, the detecting device 10 satisfies the relationship: H3=(0.1~0.4)*[(a+b)/2], 30°<θ1<60°.

H3 is the distance from each red light strip 1321 to the long side surface 21 of the product 20. θ1 is the included angle between each red light strip 1321 and the long side surface 21 of the product 20.

In the embodiment, the distance and included angle between each red light strip 1321 in the detecting mechanism 13 and the long side surface 21 of the product 20, and the included angle between each red light strip 1321 and the optical axis of the camera assembly 133 are configured to achieve a better image.

Figure 7:
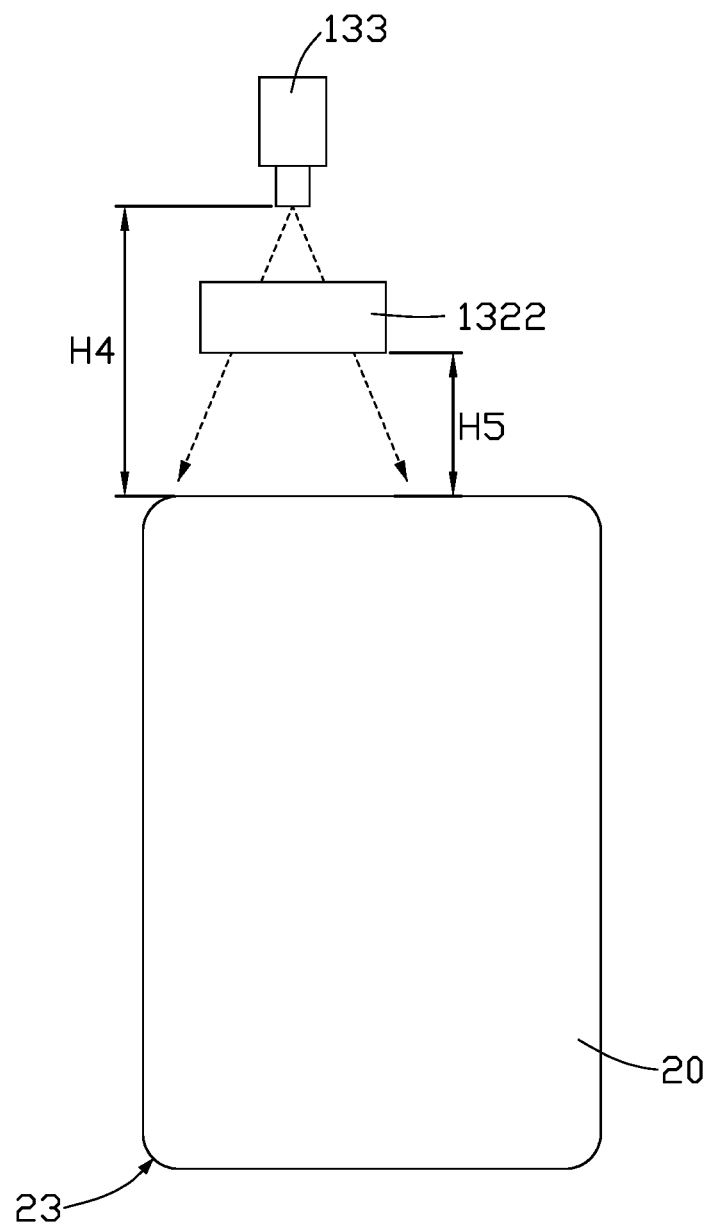
FIG. 7 is a schematic diagram of a blue light source, a camera assembly, and the width side surface of a product, in another embodiment of the present disclosure.

Referring to FIG. 7, in one embodiment, the detecting device 10 satisfies the relationship: H4=(0.2~0.8)*[(a+b)/2], H5=(0.1~0.6)*[(a+b)/2].

H4 is the distance from the camera assembly 133 to the wide side surface 22 of the product 20, and H5 is the distance from the blue light source 1322 to the wide side surface 22 of the product 20.

The distance between the camera assembly 133, the blue light source 1322 and the width side surface 22 in the detecting mechanism 13 is configured to achieve a better image.

Figure 8:
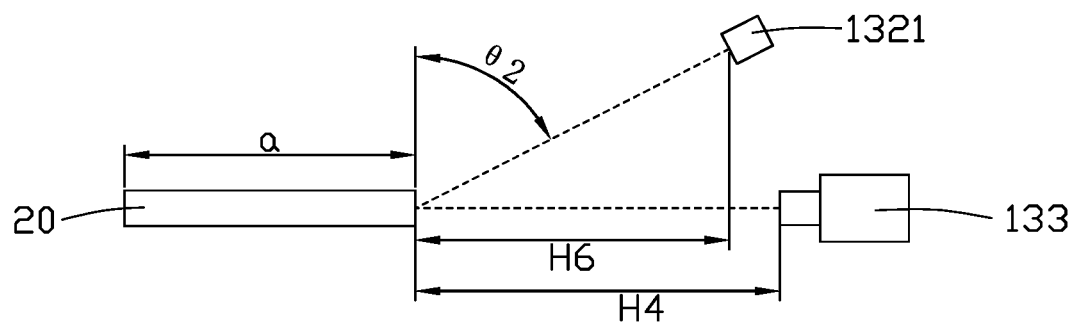
FIG. 8 is a schematic diagram of a red light strip, a camera assembly, and the width side surface of a product in a first state, in another embodiment of the present disclosure.
Figure 9:
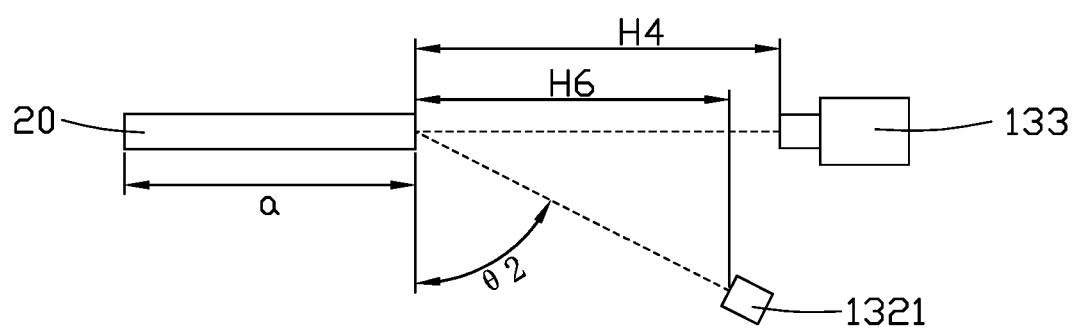
FIG. 9 is a schematic diagram of a red light strip, a camera assembly, and the width side surface of a product in a second state, in another embodiment of the present disclosure.

Referring to FIG. 8 and FIG. 9, in one embodiment, the detecting device 10 satisfies the relationship: H6=(0.1~0.5)*[(a+b)/2], 30°θ2<60°.

H6 is the distance from each red light strip 1321 to the wide side surface 22 of the product 20. θ2 is the included angle between each red light strip 1321 and the width side surface 22 of the product 20.

In the embodiment, the distance and included angle between each red light strip 1321 in the detecting mechanism 13 and the width side surface 22 of the product 20, and the included angle between each red light strip 1321 and the optical axis 1331 of the camera assembly 133 are configured to achieve a better image.

Figure 10:
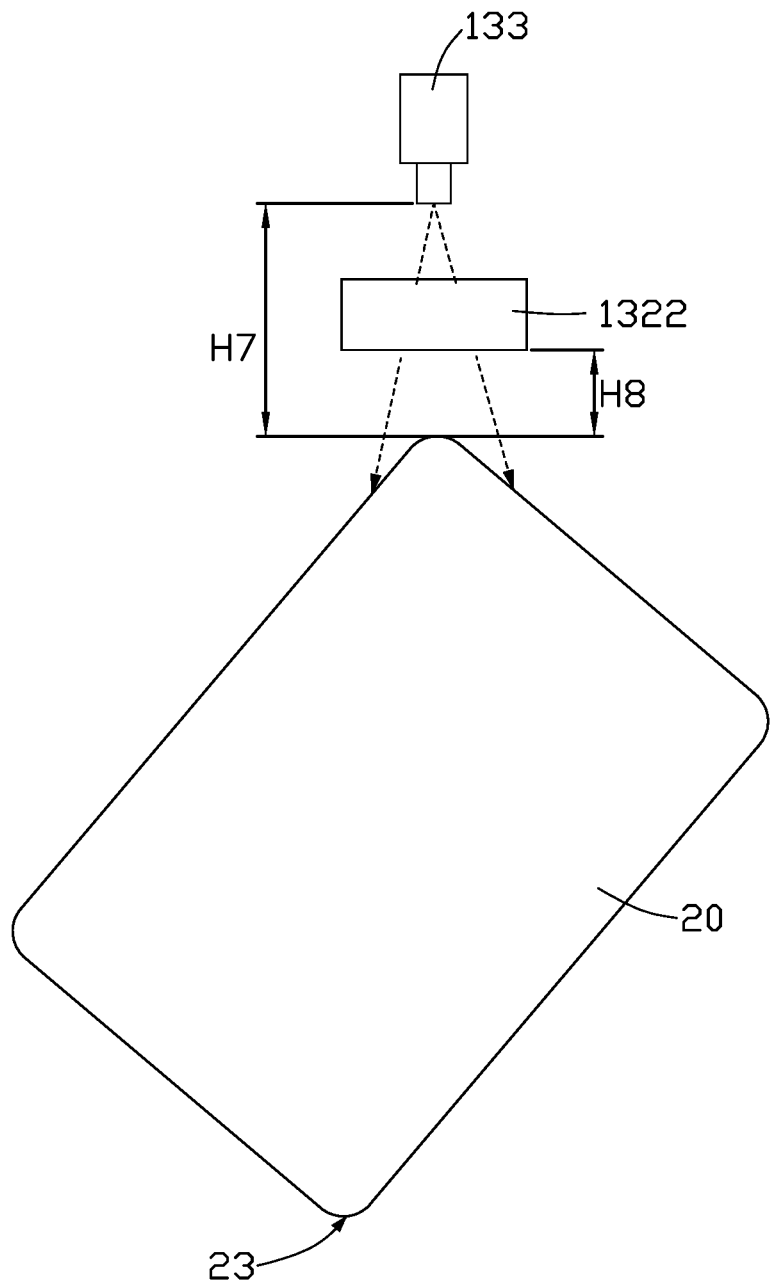
FIG. 10 is a schematic diagram of a blue light source, a camera assembly, and the chamfered side surface of a product, in another embodiment of the present disclosure.

Referring to FIG. 10, in one embodiment, the detecting device 10 satisfies the relationship: H7=(8~16)*R, H8=(5~9)*R.

H7 is the distance from the camera assembly 133 to the chamfered side surface 23 of the product 20, R is the radius of the circle where the chamfer is located, and H8 is the distance from the blue light source 1322 to the chamfered side surface 23 of the product 20.

The distance between the camera assembly 133 and the chamfered side surface 23 in the detecting mechanism 13 is configured to achieve a better image.

Figure 11:
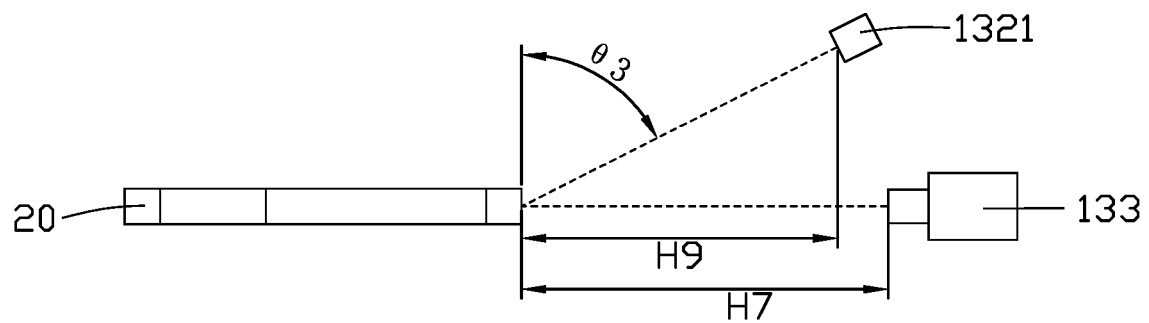
FIG. 11 is a schematic diagram of a red light strip, a camera assembly, and the chamfered side surface of a product in a first state, in another embodiment of the present disclosure.
Figure 12:
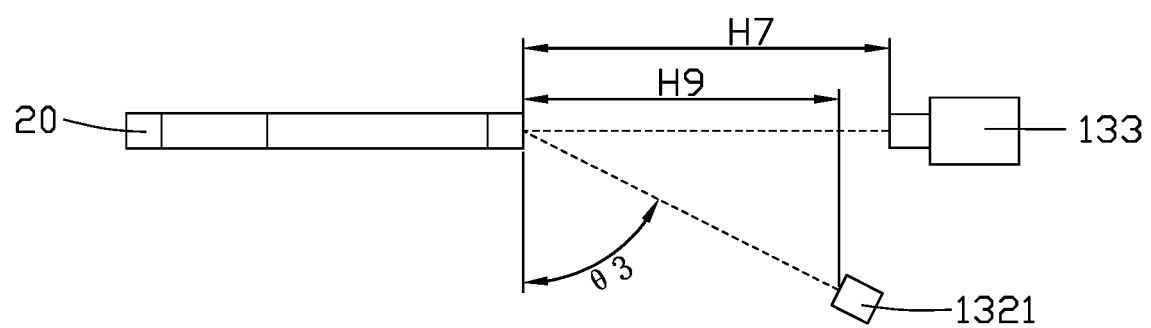
FIG. 12 is a schematic diagram of a red light strip, a camera assembly, and the chamfered side surface of a product in a second state, in another embodiment of the present disclosure.

Referring to FIG. 11 and FIG. 12, in one embodiment, the detecting device 10 satisfies the relationship: H9=(4~8)*R, 30°<θ3<50°.

H9 is the distance from each red light strip 1321 to the chamfered side surface 23 of the product 20. θ3 is the included angle between each red light strip 1321 and the chamfered side surface 23 of the product 20.

In the embodiment, the distance and included angle between each red light strip 1321 in the detecting mechanism 13 and the chamfered side surface 23 of the product 20, and the included angle between each red light strip 1321 and the optical axis 1331 of the camera assembly 133 are configured to achieve a better image.

During detection, the transmitting belt 112 drives the product 20 to the position of the detecting mechanism 13, the first driving member 1343 drives the suction nozzle 1342b to lift the product 20 to the appropriate position, and the second driving member 1344 drives the first driving member 1343 to rotate the product 20 to the appropriate side. Then, the detecting mechanism 13 is used to take an image of the side surface of the product 20. The processor 14 is used to process the obtained image to determine such defects as aforesaid on the side surface of the product 20. The detecting mechanism 13 is used to take the image of the side surface of the product 20, including taking image of the long side surface 21, of the width side surface 22, and of the chamfered side surface 23, respectively.

Referring to FIG. 4 to FIG. 6, in one embodiment, the long side surface 21 is equally divided into three parts along the length direction of the product 20, and each part is the range covered by the light emitted by the blue light source 1322 at one time. The long side surface 21 is equally divided into upper part and lower part along the height direction of the product 20. The light emitted by the red light strip light 1321 on the upper side of the camera assembly 133 covers the upper part, and the light emitted by the red light strip light 1321 on the lower side of the camera assembly 133 covers the lower part. Since the image taking process of the two long side surfaces 21 is the same, it is only necessary to drive the product 20 to rotate to the other long side surface 21 by using the clamping assembly 134 after the taking of an image of one long side surface 21 is completed. Here, taking the image taking process of one long side surface 21 is an example, the image taking process of the long side surface 21 is as follows:

First, the product 20 is rotated by the clamping assembly 134 until the length direction of the product 20 is consistent with the first direction, and the detecting frame 131 is driven to move on the supporting rail manually or through power components (such as cylinder, motor), so that the light emitted by the blue light source 1322 successively covers the three parts of the long side surface 21. The images of the three parts of the long side surface 21 are obtained using the camera assembly 133. Next, the detecting frame 131 is driven to move on the supporting rail 1221 manually or through power components (such as cylinder and motor), so that the camera assembly 133 is located in the center of the long side surface 21, so that the two red light strips 1321 cover the upper part and lower part of the long side surface 21 respectively. At this time, images of the upper part and the lower part of the long side surface 21 are obtained using the camera assembly 133 respectively. The processor 14 processes the images of the three parts of the long side surface 21 to determine the defects of the long side surface 21, such as depressions, knife marks, dirt, crush marks, bright spots, bright lines, embossing, pitting, and acid droppings. The processor 14 processes the obtained images of the upper part and the lower part of the long side surface 21 to determine such defects as these.

In another embodiment, the long side surface 21 can also be divided into other parts along its length direction, as long as the long side surface 21 can be covered by the light emitted by the blue light source 1322 and the corresponding image can be obtained by using the camera assembly 133.

Referring to FIG. 7 to FIG. 9, in one embodiment, the wide side surface 22 is equally divided into two parts along the width direction of the product 20, each part is the range covered by the light emitted by the blue light source 1322, and the width side surface 22 is equally divided into upper part and lower part along the height direction of the product 20. The light emitted by the red light strip light 1321 on the upper side of the camera assembly 133 covers the upper part, and the light emitted by the red light strip light 1321 on the lower side of the camera assembly 133 covers the lower part. Since the image taking process of the two wide side surfaces 22 is the same, it is only necessary to drive the product 20 to rotate to the other width side surface 22 by using the clamping assembly 134 after the image-taking of one width side surface 22 is completed. Here, the image-taking process of one of the width side surfaces 22 is an example, the image taking process of the width side surface 22 is as follows:

First, the product 20 is rotated by the clamping assembly 134 until the width direction of the product 20 is consistent with the first direction, and the detecting frame 131 is driven to move on the supporting rail manually or through power components (such as cylinder, motor), so that the light emitted by the blue light source 1322 successively covers the two parts of the wide side surface 22, and images of the two parts of the wide side surface 22 are obtained using the camera assembly 133. Then, the detecting frame 131 is driven to move on the supporting rail 1221 manually or through power components (such as cylinder and motor), so that the camera assembly 133 is located in the center of the wide side surface 22, so that the two red light strips 1321 cover the upper part and lower part of the wide side surface 22 respectively. At this time, images of the upper part and the lower part of the wide side surface 22 are obtained using the camera assembly 133 respectively. The processor 14 processes the images of the two parts of the wide side surface 22 to determine such defects as aforesaid. The processor 14 processes the obtained images of the upper part and the lower part of the wide side surface 22 to determine such defects on the width side surface 22.

In another embodiment, the width side surface 22 can also be divided into other parts along its length direction, as long as the wide side surface 22 can be covered by the light emitted by the blue light source 1322 and an image can be obtained by using the camera assembly 133.

Referring to FIG. 10 to FIG. 12, in one embodiment, the light emitted by the blue light source 1322 covers the chamfered side surface 23, the chamfered side surface 23 is equally divided into upper part and lower part along the height direction of the product 20. The light emitted by the red light strip 1321 on the upper side of the camera assembly 133 covers the upper part, and the light emitted by the red light strip 1321 on the lower side of the camera assembly 133 covers the lower part. Since the image taking process of the four chamfered side surfaces 23 is the same, it is only necessary to use the clamping assembly 134 to drive the product 20 to rotate to the other chamfered side surface 23 after the image-taking of one chamfered side surface 23 is completed. Here, taking the image-taking process of one chamfered side surface 23 is an example, the image-taking process of the chamfered side surface 23 is as follows:

First, the product 20 is rotated to the chamfered side surface 23 by the clamping assembly 134 and covered by the light emitted by the blue light source 1322. At this time, an overall image of the chamfered side surface 23 is obtained by the camera assembly 133. Then, the upper part and the lower part of the chamfered side surface 23 are illuminated by the two red light strips 1321. At this time, the images of the upper part and the lower part of the chamfered side surface 23 are obtained by using the camera assembly 133. Finally, the processor 14 processes the obtained overall image of the chamfered side surface 23 to determine the existence of defects on the chamfered side surface 23. The processor 14 processes the images of the upper part and the lower part of the chamfered side surface 23 to determine the existence of defects on the chamfered side surface 23.

The above detecting device 10 can also be set as three equivalent detecting devices 10 arranged along the first direction, one detecting device 10 is used to detect the defects of the long side surface 21, one detecting device 10 is used to detect the defects of the width side surface 22, and the other detecting device 10 is used to detect the defects of the chamfered side surface 23. Therefore, the long side surface 21, the width side surface 22, and the chamfered side surface 23 are detected by a corresponding detecting device 10, reducing the working load of a single detecting device 10 and improving the detection efficiency per unit time.

Those of ordinary skill in the art should realize that the above embodiments are only used to illustrate the present disclosure, but not to limit the present disclosure. As long as they are within the essential spirit of the present disclosure, the above embodiments are appropriately made. Changes and modifications are to fall within the scope of protection of the present disclosure.

What is claimed is:

1. A detecting device configured for detecting a side surface of a product, the detecting device comprising:
   a supporting mechanism; wherein the supporting mechanism comprises a supporting platform;
   a transmitting mechanism carrying and transmitting the product; wherein the transmitting mechanism is arranged on the supporting mechanism; wherein the transmitting mechanism comprises a transmitting bracket and a transmitting belt, the transmitting bracket is arranged on the supporting platform, the transmitting belt is configured to carry and transmit the product;
   a detecting mechanism comprising a detecting frame, a light source assembly, a camera assembly, and a clamping assembly, and wherein the detecting frame is arranged on the supporting mechanism to move along a first direction, the camera assembly is slidably connected to the detecting frame along a second direction, the camera assembly is an array of cameras, the light source assembly is connected to the detecting frame; the light source assembly comprises two red light strips and a blue light source, the two red light strips are arranged such that an included angle between light emitted by the two red light strips and the side surface of the product is an acute angle, and the two red light strips are further arranged along the first direction and spaced along a third direction, the first direction, the second direction and the third direction are perpendicular to each other, the blue light source is arranged coaxially with the camera assembly, the clamping assembly is arranged on the supporting mechanism for clamping and rotating the product so that the side surface of the product is located between the two red light strips, the camera assembly obtains an image of the side surface of the product under the light of the light source assembly; and wherein the clamping assembly comprises a clamping frame and a clamping member, the clamping frame is arranged on the supporting platform, the clamping member is configured to clamp the product;

a processor connecting to the camera assembly and pre-processing the image obtained by the camera assembly of the side surface of the product, the processor being configured to obtaining a detection result of the image of the side surface of the product.

2. The detecting device of claim 1, wherein:
the detecting device is adjustable to satisfy a relationship of $H1=k1*[(a+b)/2]$, $H2=k2*[(a+b)/2]$;
wherein H1 is a distance from the camera assembly to a surface defined by a length and a height of the product, H2 is a distance from the blue light source to the surface defined by the length and the height of the product, a is a length of the product, b is a width of the product a value of k1 is between 0.2 and 0.8, and a value of k2 is between 0.1 and 0.5.

3. The detecting device of claim 2, wherein:
the detecting device is further adjustable to satisfy a relationship of $H3=k3*[(a+b)/2]$, $30°<\theta1<60°$;
wherein H3 is a distance from each of the red light strips to the surface defined by the length and the height of the product, θ1 is the included angle between each of the red light strips and the surface defined by the length and the height of the product, and a value of k3 is between 0.1 and 0.4.

4. The detecting device of claim 1, wherein:
the detecting device is adjustable to satisfy a relationship of $H4=k1*[(a+b)/2]$, $H5=k4*[(a+b)/2]$;
wherein H4 is a distance from the camera assembly to a surface defined by a width and a height of the product, H5 is a distance from the blue light source to the surface defined by the width and the height of the product, a is a length of the product, b is a width of the product, a value of k1 is between 0.2 and 0.8, and a value of k4 is between 0.1 and 0.6.

5. The detecting device of claim 4, wherein:
the detecting device is further adjustable to satisfy the relationship of $H6=k2*[(a+b)/2]$, $30°<\theta2<60°$;
wherein H6 is a distance from each of the red light strips to the surface defined by the width and the height of the product, θ2 is the included angle between the each of the red light strips and the surface defined by the width and the height of the product, and a value of k2 is between 0.1 and 0.5.

6. The detecting device of claim 1, wherein:
the detecting device is adjustable to satisfy the relationship of $H7=k5*R$, $H8=k6*R$;
wherein H7 is a distance from the camera assembly to a surface where a chamfer is located, R is radius of a circle where the chamfer is located, H8 is a distance from the blue light source to the surface where the chamfer is located, a value of k5 is between 8 and 16, and a value of k6 is between 5 and 9.

7. The detecting device of claim 6, wherein:
the detecting device is further adjustable to satisfy the relationship of $H9=k7*R$, $H8=k6*R$, $30°<\theta3<50°$;
wherein H9 is a distance from each of the red light strips to a surface where the chamfer of the product is located, θ3 is the included angle between the each of the red light strips and the surface where the chamfer of the product is located, a value of k7 is between 4 and 8.

8. The detecting device of claim 1, wherein:
the supporting mechanism further comprises a supporting frame, the supporting frame is arranged on the supporting platform, the supporting frame is provided with a supporting rail arranged along the first direction, and the detecting frame is slidably connected to the supporting rail.

9. The detecting device of claim 8, wherein:
the detecting frame comprises a first detecting rod, a second detecting rod, and a third detecting rod, the first detecting rod is slidably connected to the supporting rail, the first detecting rod is provided with a detecting rack arranged along the second direction, the second detecting rod is slidably connected to the detecting rack, and the camera assembly is connected to the second detecting rod, the third detecting rod is slidably connected to the detecting rack, and is located between the first detecting rod and the transmitting mechanism; wherein each of the two red light strips and the blue light source is connected to the third detecting rod.

10. The detecting device of claim 8, wherein:
the clamping assembly further comprises a first driving member and a second driving member, the first driving member is connected to the clamping member to drive the clamping member to clamp the product, the second driving member is arranged on the clamping frame, and the second driving member is connected to the first driving member, the second driving member is configured to drive the first driving member to drive the product to rotate.

11. A detecting device configured for detecting a side surface of a product, the detecting device comprising:
a supporting mechanism; wherein the supporting mechanism comprises a supporting platform;
a transmitting mechanism carrying and transmitting the product; wherein the transmitting mechanism is arranged on the supporting mechanism; wherein the transmitting mechanism comprises a transmitting bracket and a transmitting belt, the transmitting bracket is arranged on the supporting platform, the transmitting belt is configured to carry and transmit the product;
a detecting mechanism comprising a detecting frame, a light source assembly, a camera assembly, and a clamping assembly, and wherein the detecting frame is arranged on the supporting mechanism to move along a first direction, the camera assembly is slidably connected to the detecting frame along a second direction, the camera assembly is an array of cameras, the light source assembly is connected to the detecting frame; the light source assembly comprises two red light strips and a blue light source, the two red light strips are arranged such that an included angle between light emitted by the two red light strips and the side surface of the product is an acute angle, and the two red light strips are further arranged along the first direction and spaced along a third direction, the first direction, the second direction and the third direction are perpendicular to each other, the blue light source is arranged coaxially with the camera assembly, the clamping assembly is arranged on the supporting mechanism for clamping and rotating the product, so that the side surface of the product is located between the two red light strips, the camera assembly obtains an image of the side surface of the product under the light of the light source assembly; and wherein the clamping assembly comprises a clamping frame and a clamping member, the clamping frame is arranged on the supporting platform, the clamping member is configured to clamp the product;

a processor connecting to the camera assembly and preprocessing the image obtained by the camera assembly of the side surface of the product, the processor being configured to obtaining a detection result of the image of the side surface of the product;

wherein the supporting mechanism further comprises a supporting frame, the supporting frame is arranged on the supporting platform, the supporting frame is provided with a supporting rail arranged along the first direction, and the detecting frame is slidably connected to the supporting rail.

12. The detecting device of claim 11, wherein:

the detecting device is adjustable to satisfy a relationship of $H1=k1*[(a+b)/2]$, $H2=k2*[(a+b)/2]$;

wherein H1 is a distance from the camera assembly to a surface defined by a length and a height of the product, H2 is a distance from the blue light source to the surface defined by the length and the height of the product, a is a length of the product, b is a width of the product, a value of k1 is between 0.2 and 0.8, and a value of k2 is between 0.1 and 0.5.

13. The detecting device of claim 12, wherein:

the detecting device is further adjustable to satisfy a relationship of $H3=k3*[(a+b)/2]$, $30°<\theta1<60°$;

wherein H3 is a distance from each of the red light strips to the surface defined by the length and the height of the product, θ1 is the included angle between each of the red light strips and the surface defined by the length and the height of the product, and a value of k3 is between 0.1 and 0.4.

14. The detecting device of claim 11, wherein:

the detecting device is adjustable to satisfy a relationship of $H4=k1*[(a+b)/2]$, $H5=k4*[(a+b)/2]$;

wherein H4 is a distance from the camera assembly to a surface defined by a width and a height of the product, H2 is a distance from the blue light source to the surface defined by the width and the height of the product, a is a length of the product, b is a width of the product, a value of k1 is between 0.2 and 0.8, and a value of k4 is between 0.1 and 0.6.

15. The detecting device of claim 14, wherein:

the detecting device is further adjustable to satisfy the relationship of $H6=k2*[(a+b)/2]$, $30°<\theta2<60°$;

wherein H6 is a distance from each of the red light strips to the surface defined by the width and the height of the product, θ2 is the included angle between the each of the red light strips and the surface defined by the width and the height of the product, and a value of k2 is between 0.1 and 0.5.

16. The detecting device of claim 11, wherein:

the detecting device is adjustable to satisfy the relationship of $H7=k5*R$, $H8=k6*R$;

wherein H7 is a distance from the camera assembly to a surface where a chamfer is located, R is radius of a circle where the chamfer is located, and H8 is a distance from the blue light source to the surface where the chamfer is located, a value of k5 is between 8 and 16, and a value of k6 is between 5 and 9.

17. The detecting device of claim 16, wherein:

the detecting device is further adjustable to satisfy the relationship of $H9=k7*R$, $H8=k6*R$, $30°<\theta3<50°$;

wherein H9 is a distance from each of the red light strips to a surface where the chamfer of the product is located, θ3 is the included angle between the each of the red light strips and the surface where the chamfer of the product is located, a value of k7 is between 4 and 8.

18. The detecting device of claim 11, wherein:

the detecting frame comprises a first detecting rod, a second detecting rod, and a third detecting rod, the first detecting rod is slidably connected to the supporting rail, the first detecting rod is provided with a detecting rack arranged along the second direction, the second detecting rod is slidably connected to the detecting rack, and the camera assembly is connected to the second detecting rod, the third detecting rod is slidably connected to the detecting rack, and is located between the first detecting rod and the transmitting mechanism; wherein each of the two red light strips and the blue light source is connected to the third detecting rod.

19. The detecting device of claim 18, wherein:

the clamping assembly further comprises a first driving member and a second driving member, the first driving member is connected to the clamping member to drive the clamping member to clamp the product, the second driving member is arranged on the clamping frame, and the second driving member is connected to the first driving member, the second driving member is configured to drive the first driving member to drive the product to rotate.

* * * * *